Dec. 19, 1933.                    A. C. ULLOA                    1,940,380
THEFT PREVENTION DEVICE FOR VEHICLES
Filed June 10, 1931         2 Sheets-Sheet 1
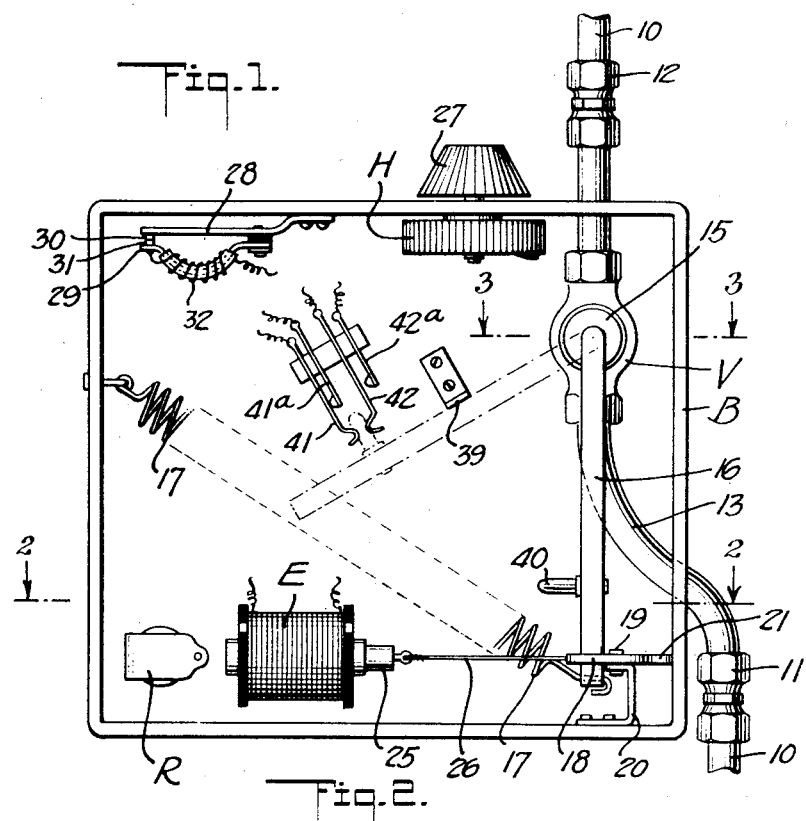
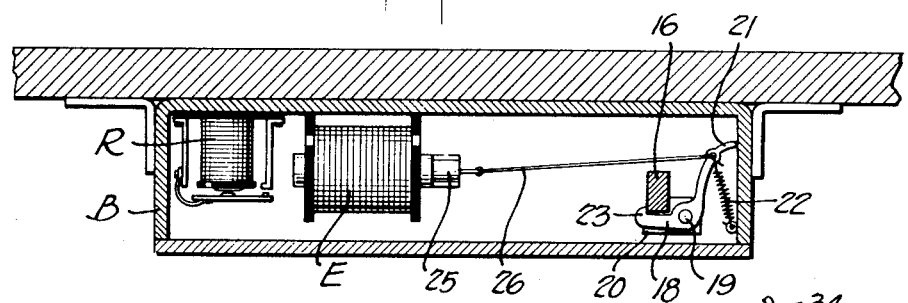
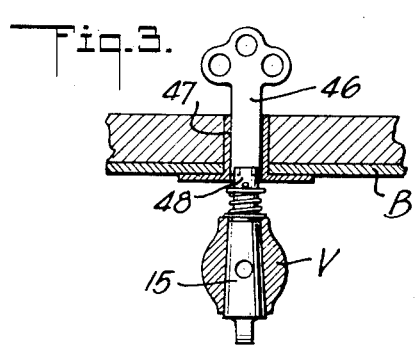
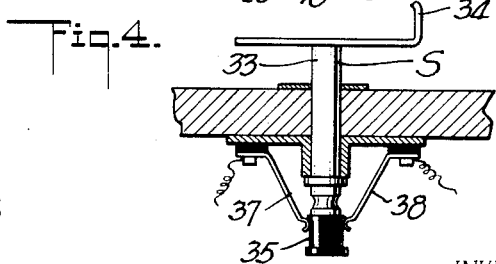
INVENTOR.
ARTURO CASTRO ULLOA
BY
ATTORNEYS.

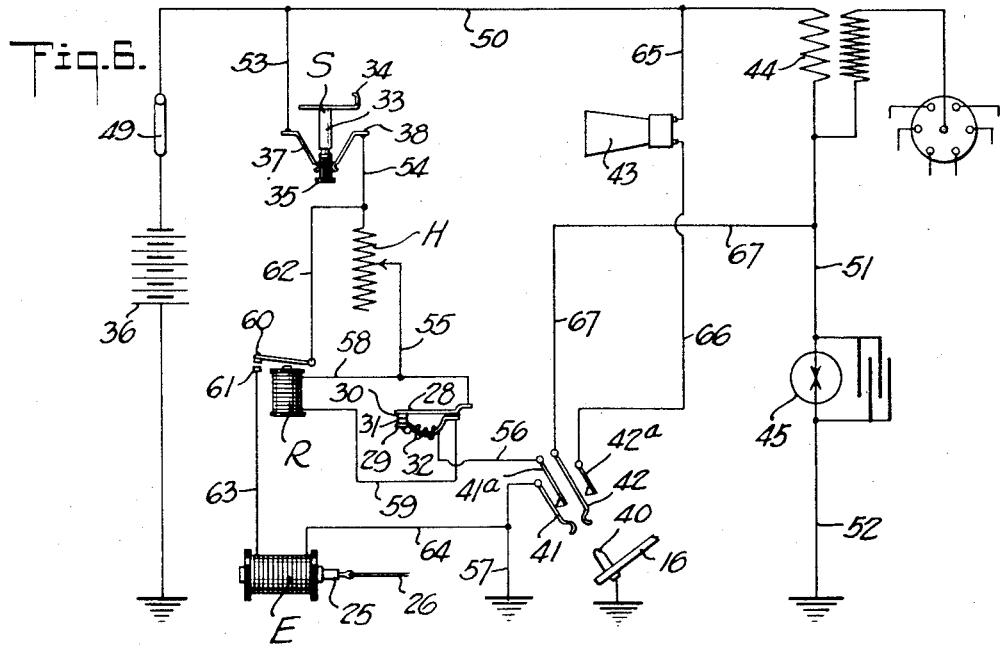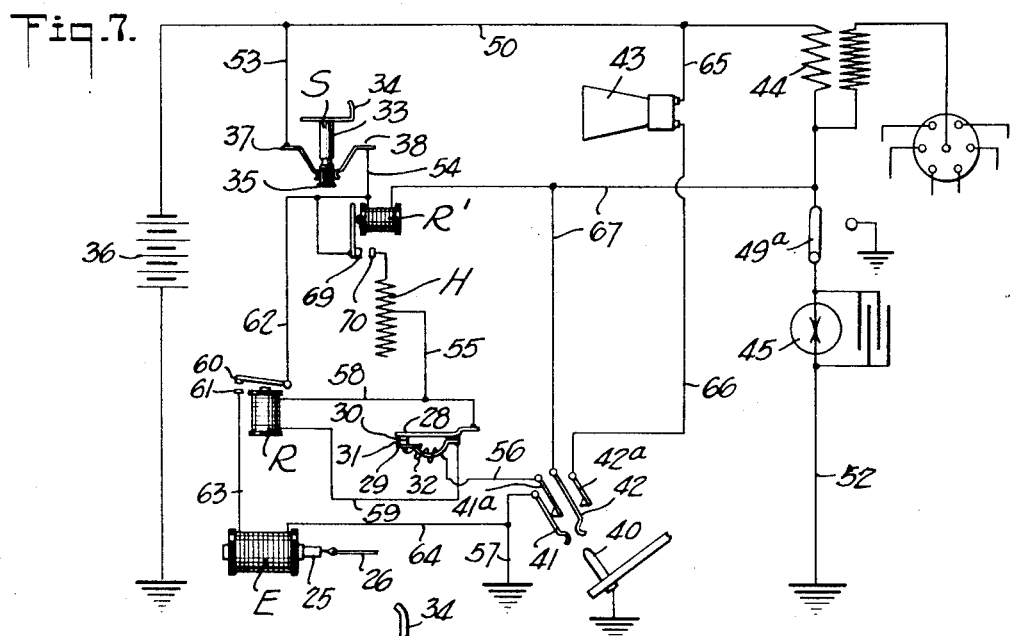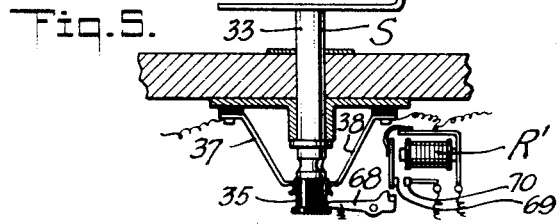

Patented Dec. 19, 1933

1,940,380

UNITED STATES PATENT OFFICE 1,940,380

THEFT PREVENTION DEVICE FOR VEHICLES

Arturo Castro Ulloa, Los Angeles, Calif.

Application June 10, 1931. Serial No. 543,466

11 Claims. (Cl. 123—198)

My invention relates to and has for a purpose the provision of a device which in its application to vehicles such as automobiles, trucks, or busses, will positively prevent the unauthorized operation of a vehicle under its own power, to the end of precluding theft of the vehicle when left unattended or in the event the occupants of the vehicle are forced therefrom incident to a hold-up.

It is a further purpose of my invention to provide a device of the above described character which functions automatically upon the elapse of a predetermined interval of time following actuation of a concealed switch, to discontinue the supply of fuel to the vehicle's engine and to disrupt its ignition circuit, thus insuring that should the occupants be forced from the vehicle in a hold-up, the vehicle will stall after being driven a short distance as will greatly facilitate recovery of the vehicle and apprehension of the bandits.

I will describe only one form of theft prevention device for vehicles embodying my invention, and will then point out the novel features thereof in claims.

In the accompanying drawings:

Figure 1 is a view showing in bottom plan, one form of theft prevention device embodying my invention, the bottom wall of a box enclosing mechanism of the device being broken away to expose the mechanism.

Figures 2 and 3 are vertical sectional views taken respectively on the lines 2—2 and 3—3 of Figure 1 and looking in the direction of the respective arrows.

Figure 4 is a vertical sectional view of a switch which occupies a concealed location on the vehicle and is manually actuated to control operation of the device.

Figure 5 is a view similar to Figure 4 and illustrating the concealed switch associated with a relay for use with a circuit such as shown in Figure 7.

Figure 6 is a diagrammatic view illustrating the electrical circuits embodied in the device.

Figure 7 is a view similar to Figure 6 and illustrating the relay of Figure 5 and the electrical circuits employed therewith when the device is applied to a vehicle wherein the usual ignition switch is operable when opened, to ground the interrupter.

Referring specifically to the drawings in which similar reference characters designate similar parts in each of the several views, my invention in its present embodiment comprises a protective casing in the form of a metal box B which is preferably secured in any suitable manner underneath the floor of the vehicle at a location enabling the fuel pipe 10 from the gasoline tank to the vacuum tank, gasoline pump or carburetor, to be connected by unions 11 and 12 to a pipe section 13 passing through the box and embodying a valve V disposed within the box.

The valve V is of the rotary tapered plug type, the plug 15 of which is provided with an operating lever 16 normally urged by a spring 17 to the position shown in broken lines in Figure 1 and wherein the valve is closed to prevent the flow of fuel through the pipe 10.

A latch 18 pivoted at 19 on a bracket 20 in the box, is provided with an arm 21 to which is connected a spring 22 for normally urging the latch to latching position wherein the bill 23 of the latch is adapted to co-act with the operating lever 16 of the valve V, in latching the lever against the action of the spring 17, in the position shown in full lines in Figure 1, and wherein the valve is open so as to permit the flow of fuel through the pipe 10.

Secured in the box B is an electromagnet E having a movable core 25 connected by a cable 26 to the arm 21 of the latch 18 for movement of the latter to non-latching position when the electromagnet is energized. Energization of the electromagnet is controlled by a relay R to which current is supplied under the control of a manually operable switch S and a thermostat T, with a rheostat H for varying the current flow to the thermostat in order to vary the time interval required to heat the thermostat to a predetermined degree.

The relay R, thermostat T and rheostat H are enclosed in the box B, with the operating knob 27 of the rheostat disposed exteriorly of the box for manual adjustment as desired. The thermostat T comprises a stationary contact arm 28 and a movable contact arm 29 having contacts 30 and 31 respectively, normally in engagement and movable out of engagement in response to flexing of the movable arm by heating of a wire coil 32 wound upon the movable arm.

The switch S is disposed on the vehicle in a concealed location accessible for foot actuation by the operator of the vehicle, and may be mounted in the floor of the vehicle. This switch comprises a reciprocably mounted plunger 33 carrying a foot pedal 34 and a sleeve 35 of insulating material which latter in the normal elevated position of the plunger shown in Figure 4 as constitutes the open position of the switch, prevents the flow of current from a battery 36 through flexible contact members 37 and 38. However, when the plunger is depressed, it bridges the contact members 37 and 38 so that current is free to flow to the thermostat T through the rheostat H, for heating of the thermostat and subsequent energization of the relay R in order to energize the electromagnet E and release the operating lever 16 with the resultant closing of the valve V.

The movement of the operating lever 16 under the action of the spring 17 is limited by a stop 39; and as the lever approaches the stop, a pin 40 on the lever engages and flexes contact members 41 and 42 respectively out of and into engagement with contact members 41a and 42a for the purpose of de-energizing the electro-magnet E; operating a signal 43 which may be visual or audible as shown; and grounding the spark coil 44 of the ignition system from the interrupter 45, all in a manner to be later described.

In order to reset the valve V to open position, a suitable key 46 (Figure 3) can be inserted into an opening 47 in the floor, and engaged with the shank 48 of the valve plug 15 for turning of the latter against the action of the spring 17 until the operating lever 16 is latched by the latch 18.

The manner in which the above described electrical instrumentalities are wired is clearly shown in Figure 6 to which reference will now be had for the operation of the device which is as follows:

With the usual ignition switch 49 closed and the switch S open, current from the battery 36 will be free to flow through wire 50 to the primary winding of the spark coil 44, thence through wire 51 to the interrupter 45 and from the latter through wire 52 back to the grounded side of the battery, thus permitting operation of the engine. It will be understood that the battery 36, ignition switch 49, spark coil 44 (the secondary of which supplies a high potential to the distributor for distribution to the spark plugs of the engine) and the interrupter 45 constitute the necessary electrical devices of a conventional ignition circuit.

However, upon depressing the plunger 33 to close the switch S, a circuit will be completed as follows: from battery 36, through wire 50, wire 53, contact member 37, plunger 33, contact member 38, wire 54, rheostat H, wire 55, stationary contact arm 28 of the thermostat, thermostat contacts 30 and 31, heating coil 32 of the thermostat, wire 56, contact members 41a and 41 and wire 57 back to the grounded side of the battery 36. Upon heating of the coil 32 a sufficient amount to cause flexing of the contact arm 29 with the resultant disengagement of the contact 31 from the contact 30, this circuit will be broken. The time interval required is of course dependent on the adjustment of the rheostat H and is of course variable at will by manipulation of the knob 27.

Upon breaking of this circuit, current from the battery will now flow through switch S, rheostat H, wire 55, wire 58, relay R, wire 59, movable contact arm 29 of the thermostat, heating coil 32, wire 56, contact members 41a and 41 and wire 57 back to the grounded side of the battery. The relay will thus be energized to cause its armature contact 60 to engage a stationary contact 61 and complete a circuit including the electromagnet E as follows: from battery through switch S, wire 54, wire 62, armature contact 60, stationary contact 61, wire 63, electromagnet E, wire 64 and wire 57 back to the grounded side of the battery.

The electromagnet E will thus be energized to cause its core 25 to exert a pull upon the cable 26 and thereby move the latch 18 to non-latching position, whereupon the operating arm 16 of the valve V will be moved by the spring 17 to the position shown in broken lines in Figure 1, thus closing the valve and preventing further supply of fuel to the engine through the pipe 10.

As the valve approaches closed position, the pin 40 will flex the contact members 41 and 42 to cause the former to disengage the contact member 41a and the latter to engage the contact member 42a. The circuit including the relay and heating coil of the thermostat will be broken upon disengagement of the contact members 41 and 41a, thus de-energizing the electromagnet E and permitting the latch 18 to return to latching position for subsequent latching of the operating member 16 when reset by the key 46.

The now engaged contact members 42 and 42a will co-act with the pin 40 which is grounded, to complete two circuits, one of which is for the purpose of actuating the signal 43 by permitting the flow of current from the battery through wire 50, wire 65, signal 43, wire 66, contact members 42a, 42 and pin 40 back to the grounded side of the battery. The other circuit is completed for the purpose of disrupting the ignition circuit by grounding the interrupter side of the spark coil 44 through a wire 67 connected to the wire 51 and to the contact 42.

It will thus be manifest that at the will of the operator and upon the elapse of a predetermined time interval following closing of the switch S, the supply of fuel to, and the ignition circuit of the engine will be disrupted automatically, so as to positively prevent unauthorized operation of the engine. As the time interval is relatively small, the vehicle can only be driven a short distance under its own power so that in the event of a hold-up involving theft of the vehicle, the recovery of the latter will be greatly facilitated.

Reference will now be had to Figures 5 and 7, the latter figure illustrating a circuit identical to that shown in Figure 6, with the exception that the ignition switch 49a is interposed between the spark coil 44 and interrupter 45 to ground the latter when the ignition switch is opened, this arrangement necessitating the use of a relay R' which is included in the circuit of Figure 7. The relay R' embodies a spring urged locking member 68, which, with the ignition switch 49a closed, is operable upon closing of the concealed switch S, to lock the armature contacts 69 and 70 of the relay R' closed, so as to prevent vibration of the armature in synchronism with the interrupter 45.

As the contacts 69 and 70 are normally open, closing of the concealed switch S will not result in the flow of current from the battery B to the rheostat H and thermostat T so long as the ignition switch 49a remains open. However, upon closing the ignition switch following closing of the switch S, the relay R' will be energized to close the circuit through the contacts 69 and 70 and thus permit the flow of current to the rheostat H and thermostat T so that the device will function in the identical manner above described in conjunction with the circuit of Figure 6. It will be manifest that unless the relay R' is provided when the ignition switch is located as in Figure 7, that the device would function upon closing of the switch S regardless of whether the ignition switch was open or closed.

Although I have herein shown and described only one form of theft prevention device for vehicles embodying my invention, it is to be understood that various changes and modifications may be made therein without departing from the spirit of the invention and the spirit and scope of the appended claims.

I claim:

1. A device of the character described comprising a valve for controlling the supply of fuel to the engine of a vehicle, means for normally urging the valve closed, means for latching the valve open, electroresponsive means for actuating the latching means to release the valve and permit closing thereof, and a circuit including a source of current supply, a manually operable switch, and means operable upon the elapse of a predetermined interval of time following closing of said switch, to supply current to the electroresponsive means.

2. A device of the character described comprising a valve for controlling the supply of fuel to the engine of a vehicle, means for normally urging the valve closed, means for latching the valve open, electroresponsive means for actuating the latching means to release the valve and permit closing thereof, and a circuit including a source of current supply, a manually operable switch, and means operable upon the elapse of a predetermined interval of time following closing of said switch, to supply current to the electroresponsive means, the last means including a thermostat and a relay for including the electroresponsive means in the circuit when the thermostat has been heated to a predetermined degree.

3. A device of the character described comprising a valve for controlling the supply of fuel to the engine of a vehicle, means for normally urging the valve closed, means for latching the valve open, electroresponsive means for actuating the latching means to release the valve and permit closing thereof, and a circuit including a source of current supply, a manually operable switch, means operable upon the elapse of a predetermined interval of time following closing of said switch, to supply current to the electroresponsive means, and means for disrupting the ignition circuit of the engine, concurrently with closing of the valve.

4. A device of the character described comprising a valve for controlling the supply of fuel to the engine of a vehicle, means for normally urging the valve closed, means for latching the valve open, electroresponsive means for actuating the latching means to release the valve and permit closing thereof, and a circuit including a source of current supply, a manually operable switch, means operable upon the elapse of a predetermined interval of time following closing of said switch, to supply current to the electroresponsive means, an ignition circuit for the engine including a spark coil and an interrupter, and means for grounding the interrupter side of the spark coil.

5. A device of the character described comprising a valve for controlling the supply of fuel to the engine of a vehicle, means for normally urging the valve closed, means for latching the valve open, electroresponsive means for actuating the latching means to release the valve and permit closing thereof, and a circuit including a source of current supply, a manually operable switch, means operable upon the elapse of a predetermined interval of time following closing of said switch, to supply current to the electroresponsive means, and means for de-energizing the electroresponsive means following energization thereof so as to permit restoration of the latching means to latching position.

6. A device of the character described comprising a valve for controlling the supply of fuel to the engine of a vehicle, means for normally urging the valve closed, means for latching the valve open, electroresponsive means for actuating the latching means to release the valve and permit closing thereof, and a circuit including a source of current supply, a manually operable switch, means operable upon the elapse of a predetermined interval of time following closing of said switch, to supply current to the electroresponsive means, a signal, and means for rendering the signal active concurrently with closing of the valve.

7. A device of the character described comprising a valve for controlling the supply of fuel to the engine of a vehicle, electroresponsive means for controlling closing of the valve, and a circuit including a source of current supply, thermo-responsive means, a switch for controlling the supply of current to the thermo-responsive means, and means for supplying current to the electro-responsive means when the thermo-responsive means has been heated to a predetermined degree.

8. A device of the character described comprising a valve for controlling the supply of fuel to the engine of a vehicle, electroresponsive means for controlling closing of the valve, and a circuit including a source of current supply, a manually operable switch, a thermostat, and a relay for including the electroresponsive means in the circuit when a sufficient interval of time has elapsed following closing of the switch, to effect heating of the thermostat to a predetermined degree.

9. A device of the character described comprising a valve for controlling the supply of fuel to the engine of a vehicle, a member for actuating the valve, means for normally urging the valve closed, a latch engageable with the member to releasably retain the valve open, an electromagnet operatively connected to the latch to move the latter to non-latching position in response to energization of the electromagnet and thereby permit the valve to move to closed position, and a circuit including a source of current supply, a manually operable switch, a thermostat in said circuit, and a relay operable to include the electromagnet in the circuit when a sufficient interval of time has elapsed following closing of the switch, to effect heating of the thermostat to a predetermined degree.

10. A device of the character described comprising a valve for controlling the supply of fuel to the engine of a vehicle, a member for actuating the valve, means for normally urging the valve closed, a latch engageable with the member to releasably retain the valve open, an electromagnet operatively connected to the latch to move the latter to non-latching position in response to energization of the electromagnet and thereby permit the valve to move to a closed position, and a circuit including a source of current supply, a manually operable switch, a pair of contact members included in said circuit and normally in engagement, and a contact carried by the valve actuating member and operable during movement of the latter in closing the valve, to disengage the contact members and thereby de-energize the electromagnet so as to permit movement of the latch to latching position.

11. A device of the character described comprising a valve for controlling the supply of fuel to an engine, electro-responsive means for controlling closing of the valve, and a circuit including a source of current supply, a switch, a thermostat, and means for including the electro-responsive means in the circuit when a sufficient interval of time has elapsed following closing of the switch, to effect heating of the thermostat to a predetermined degree.

ARTURO CASTRO ULLOA.